United States Patent [19]

Yoneda

[11] Patent Number: 5,401,933
[45] Date of Patent: Mar. 28, 1995

[54] METHOD FOR WELDING OF END PLUG OF CONTROL ROD

[75] Inventor: Eiji Yoneda, Tohkai, Japan

[73] Assignee: Mitsubishi Nuclear Fuel Co., Tokyo, Japan

[21] Appl. No.: 154,557

[22] Filed: Nov. 19, 1993

[30] Foreign Application Priority Data

Nov. 20, 1992 [JP] Japan .................. 4-312468

[51] Int. Cl.$^6$ ............................................. B23K 11/00
[52] U.S. Cl. .................. 219/117.1; 219/107
[58] Field of Search .............. 219/117.1, 86.1, 107

[56] References Cited

U.S. PATENT DOCUMENTS 4,097,712  6/1978  Bezold .................. 219/107
4,663,510  5/1987  Ritter .................. 219/86.1

FOREIGN PATENT DOCUMENTS 2-176598  7/1990  Japan .

Primary Examiner—Clifford C. Shaw
Attorney, Agent, or Firm—Oblon, Spivak, McClelland, Maier & Neustadt

[57] ABSTRACT

A method is disclosed for welding an end plug to an open end of a surface-coated tube in order to provide a control rod. First, the end plug is brought into pressed abutment with the open end of the surface-coated tube. Then, resistance welding is performed in order to join the end plug with the open end of the surface-coated tube by applying electric current between the surface-coated tube and the end plug to heat the same while keeping the end plug pressed in abutment with the open end of the surface-coated tube. With these procedures, even when a surface-coated tube having a hard coating formed over its entire length is employed, the coating material is prevented from dissolving into the welded portion and therefore ensures an excellent welding quality, and the resulting control rod exhibits excellent characteristics over its entire length.

8 Claims, 1 Drawing Sheet

METHOD FOR WELDING OF END PLUG OF CONTROL ROD

BACKGROUND ART

The Present invention relates to a method for welding an end plug to a respective open end of a surface-coated tube to produce a control rod.

A surface-coated tube of the type that includes a hard coating layer such as chromium plating formed on an outer peripheral surface of a tube body has recently been employed more frequently for the manufacture of control rods. However, when a conventional tungsten inert gas (TIG) welding is employed to weld an end plug to the open end of the surface-coated tube, the coating material plated on the tube dissolves into the welded portion and consequently the quality of the welding deteriorates.

In order to avoid this problem, the hard coating has not been performed on a portion of the tube body which is proximate to the welding portion. However, this means that the non-coated portion of the surface-coated tube proximate to the welding portion is inferior in wear resistance to the other portion thereof.

SUMMARY OF THE INVENTION

It is therefore the object of the present invention to provide a method for welding of an end plug of a control rod which enables welding of high quality without causing the coated material to dissolve into the welded portion even when a surface-coated tube having a coating layer formed up to the end thereof is employed, so that a control rod exhibiting high wear resistance over its entire length can be manufactured.

According to the present invention, there is provided a method for welding an end plug to an open end of a surface-coated tube to provide a control rod, comprising the steps of:

(a) bringing the end plug into pressed abutment with the open end of the surface-coated tube; and (b) performing resistance welding to join the end plug with the open end of the surface-coated tube by applying electric current between the surface-coated tube and the end plug to heat the same while keeping the end plug pressed in abutment with the open end of the surface-coated tube.

In the aforesaid method, when electric current is passed between the surface-coated tube and the end plug, the temperature of the abutting portions of the tube and the end plug increases because of the heat generated by specific and contact resistances to the current flow, and arrives at such a value so as to enable metallurgical joining of the abutting portions. Thus, since force which keeps the end plug pressed in abutment with the open end of the surface-coated tube is being exerted, the end plug is smoothly joined to the open end of the tube.

In the foregoing, when the end plug is joined to the end portion of the surface-coated tube, a peripheral protuberance which protrudes radially outwardly from the outer surface of the tube is formed on a welded portion. This protuberance is removed by sanding.

In addition, the end plug may be formed so as to have a conical surface at that end surface to be brought into contact with the surface-coated tube. When the end plug is arranged with the conical surface being held and pressed in abutment with the open end of the surface-coated tube, current flow and heating are localized at the abutting portion to thereby ensure a projection welding.

The surface-coated tube, which has a tube body and a hard coating formed on an outer peripheral surface thereof, may include the hard coating over its entire length. With the use of the surface-coated tube of this construction, a control rod exhibiting high wear resistance over its entire length can be manufactured.

Furthermore, the end plug may be formed of the same material as the tube body of the surface-coated tube, or may include a plug body formed of the same material as the tube body of the surface-coated tube, and a hard coating provided thereon and formed of the same material as the hard coating of the surface-coated tube.

DESCRIPTION OF THE PREFERRED EMBODIMENTS OF THE INVENTION

Figure 2:
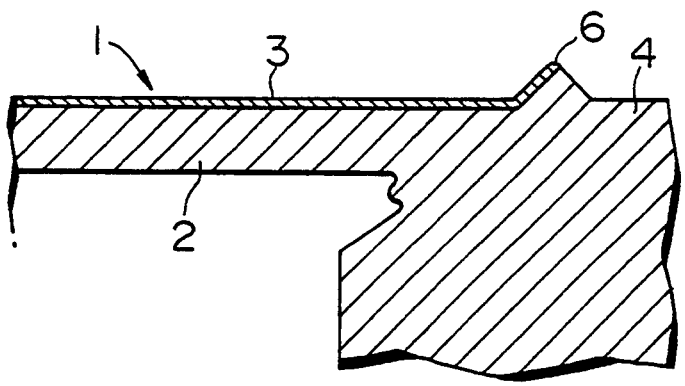
FIG. 2 is a view similar to FIG. 1, but showing the state after the completion of the welding process.
Figure 3:
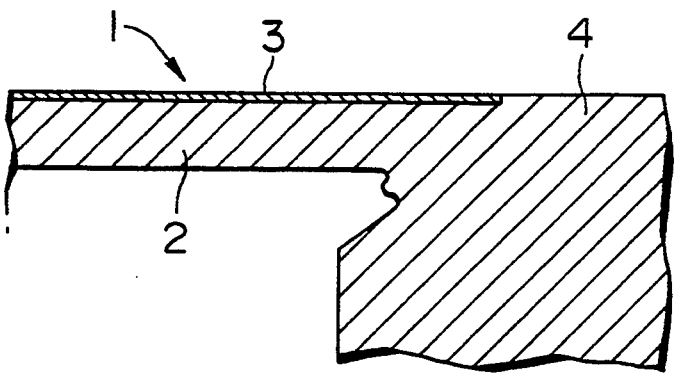
FIG. 3 is a view similar to FIG. 1, but showing the state after the sanding process.

A preferred embodiment of the present invention will be described with reference to FIGS. 1 to 3.

In the drawings, the reference numeral 1 denotes a surface-coated tube for a control rod which comprises a tubular member or tube body 2 made of zircaloy and a hard coating layer 3 such as chromium plating formed on an outer peripheral surface thereof. As best shown in FIG. 1, the hard coating layer 3 is formed on the tube body 2 over its entire length. Furthermore, the reference numeral 4 denotes an end plug of zircaloy which is to be welded to a respective open end of the surface-coated tube 1. The end plug 4 is formed such that an end face to be brought into contact with the open end of the surface-coated tube has an outer peripheral conical surface or portion 5 tapering towards the end face.

When manufacturing a control rod, neutron absorbers as well as coil springs are accommodated in the surface-coated tube 1. Then, the end plug 4 is press-fitted into a respective open end of the surface-coated tube with its conical portion being held and pressed in abutment with the open end thereof. Thereafter, girth welding is performed by means of edge-ring projection resistance welding.

Figure 1:
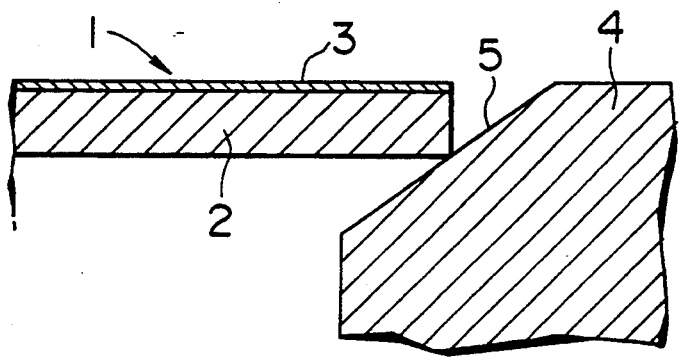
FIG. 1 is a cross-sectional view illustrating a welding method in accordance with a first embodiment of the present invention, and showing the step of bringing an end plug into pressed abutment with an open end of a surface-coated tube.

More specifically, as shown in FIG. 1, the conical surface 5 of the end plug 4 is brought into pressed abutment with the open end of the surface-coated tube 1, and an electric current is passed between the surface-coated tube 1 and the end plug 4 while keeping the end plug 4 in pressing abutment with the open end of the surface-coated tube 1. Thus, the temperature of the abutting portions of the tube 1 and the end plug 4 increases by the heat generated by specific and contact resistances to the current flow, and arrives at such a value as to enable metallurgical joining of the abutting portions. As a result, due to the pressing force exerted between the surface-coated tube 1 and the end plug 4, the surface-coated tube 2 and the end plug 4 are joined to each other while, as shown in FIG. 2, causing the outer peripheral surface of the joined portion to protrude radially outwards to form a peripheral protuberance 6. Thereafter, as shown in FIG. 3, the protuberance 6 is removed by sanding the same. Thus, the hard coating layer 3 remains on almost the entire outer surface of the tube body 2 exclusive of the protuberance 6, and hence the resulting control rod exhibits excellent wear resistance over almost its entire length. In addition, the resistance welding process is advantageous over the conventional TIG welding or the laser welding in that the adverse influence due to heat can be avoided. Hence, a microstructure of the material can be maintained without undergoing any change due to heat, and the deterioration of hardness can be prevented. Additionally, it becomes possible to reduce time required for welding, and to perform the welding without rotating a control rod or a torch.

As described above, in the welding method of the present invention, the end plug is brought into pressed abutment with the open end of the surface-coated tube, and resistance welding is performed to join the end plug with the open end of the surface-coated tube by applying electric current between the surface-coated tube and the end plug to heat the same while keeping the end plug pressed in abutment with the open end of the surface-coated tube. Therefore, when electric current is passed between the surface-coated tube and the end plug, the temperature of the abutting portions of the tube and the end plug increases because of the heat generated by specific and contact resistances to the current flow, and arrives at such a value so as to enable metallurgical joining of the abutting portions. Since force which keeps the end plug pressed in abutment with the open end of the surface-coated tube is being exerted, the end plug is smoothly joined to the open end of the tube. Accordingly, even when a surface-coated tube having a hard coating formed over its entire length is employed, the coating material is prevented from dissolving into the welded portion and therefore ensures an excellent welding quality, and the resulting control rod exhibits an excellent wear resistance over its entire length.

Figure 4:
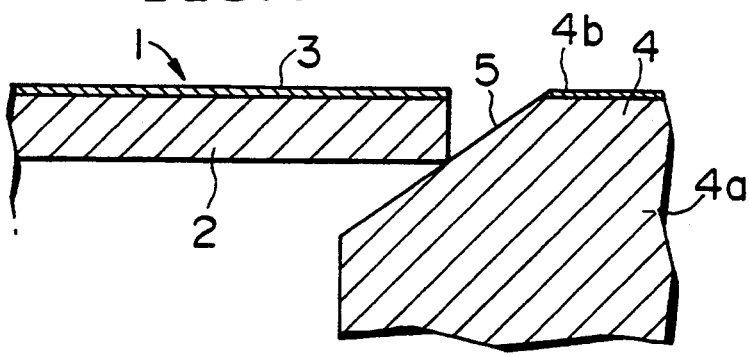
FIG. 4 is a view similar to FIG. 1, but showing a modification of the method of the present invention.

Obviously, many modifications and variations of the present invention are possible in the light of the above teachings. For example, in the above-mentioned embodiment, the end plug is of a non-coated integral construction formed of the same material as the tube body of the surface-coated tube. However, as shown in FIG. 4, the end plug 4 may be formed so as to have a plug body 4a formed of the same material as the tube body of the surface-coated tube and a hard coating 4b provided thereon and formed of the same material as the hard coating of the surface-coated tube. With this construction, it becomes possible to enjoy the high wear resistance even over the ends of the control rod.

Furthermore, the present application claims the priority of Japanese Patent Application No. 4-312468 filed on Nov. 20, 1992, which is herein incorporated by reference.

What is claimed is:

1. A method for welding an end plug to an open end of a surface-coated tube to provide a control rod, comprising the steps of:
   (a) providing said surface-coated tube so as to include a tube body having said open end and a hard coating formed on an outer peripheral surface thereof so as to extend to said open end, and providing said end plug formed of the same material as said tube body of said surface-coated tube;
   (b) bringing said end plug into pressing abutment with said open end of said surface-coated tube; and
   (c) performing resistance welding to join said end plug with said open end of said surface-coated tube by applying electric current between said surface-coated tube and said end plug to heat the same while keeping said end plug in pressing abutment with said open end of said surface-coated tube.

2. A welding method as recited in claim 1, further comprising removing an outward radially-protruding peripheral proturbence which is formed on a welded portion during said resistance welding.

3. A welding method as recited in claim 1, wherein said end plug includes a conical surface formed at an end thereof and being brought into pressed abutment with said open end of said surface-coated tube.

4. A method for welding an end plug to an open end of a surface-coated tube to provide a control rod, comprising the steps of:
   (a) providing said surface-coated tube so as to include a tube body having said open end and a hard coating formed on an outer peripheral surface thereof so as to extend to said open end, and providing said end plug which includes a plug body formed of the same material as said tube body of said surface-coated tube and a hard coating provided thereon and formed of the same material as said hard coating of said surface-coated tube;
   (b) bringing said end plug into pressing abutment with said open end of said surface-coated tube; and
   (c) performing resistance welding to join said end plug with said open end of said surface-coated tube by applying electric current between said surface-coated tube and said end plug to heat the same while keeping said end plug in pressing abutment with said open end of said surface-coated tube.

5. A method for welding an end plug to an open end of a surface-coated tube to provide a control rod, comprising the steps of:
   (a) providing said surface-coated tube so as to include a tube body having said open end and a hard coating formed on an outer peripheral surface thereof so as to extend to said open end, and providing said end plug formed of the same material as said tube body of said surface-coated tube;
   (b) bringing a portion of said end plug into engagement with a portion of said tube body defining said open end of said surface-coated tube with said portion of said end plug engaging said portion of said tube body at a location on said open and of said surface-coated tube in spaced relationship with respect to said hard coating on said surface-coated tube;
   (c) performing resistance welding to join said end plug with said open end of said surface-coated tube by applying electric current between said surface-coated tube and said end plug to heat the same while keeping said end plug in pressing abutment with said open end of said surface-coated tube;
   (d) thereby forming a welded joint between said end plug and said surface-coated tube which is free of any said hard coating dissolved therein.

6. A welding method as recited in claim 5, wherein said surface-coated tube includes an inner surface, said open and includes an end wall and both said inner surface and said end wall are free of said hard coating; said end plug includes a conical surface formed at a first end thereof; and bringing said conical surface of said end plug into engagement with said end wall adjacent to said inner surface of said surface-coated tube.

7. A welding method as recited in claim 6, wherein said tube body is made of zircaloy and said hard coating comprises a layer of chromium plating.

8. A welding method as recited in claim 6 wherein said end plug includes a substantially cylindrical surface which extends from said conical surface to a second end thereof; providing a hard coating on said substantially cylindrical surface formed of the same material as said hard coating of said surface coated tube while maintaining said conical surface of said end plug free of said harding coating.

* * * * *